United States Patent [19]

Panock

[11] 4,366,772

[45] Jan. 4, 1983

[54] STALL COCK AND PULSATOR FOR A MILKER

[75] Inventor: Walter C. Panock, Bloomingdale, Ill.

[73] Assignee: Babson Bros. Co., Oak Brook, Ill.

[21] Appl. No.: 248,837

[22] Filed: Mar. 30, 1981

[51] Int. Cl.³ ............................................. A01J 5/14
[52] U.S. Cl. .................................. 119/14.01; 137/550
[58] Field of Search ................ 119/14.01, 14.1, 14.28, 119/14.41; 285/DIG. 15; 339/97 R, 97 P, 98; 137/550

[56] References Cited

U.S. PATENT DOCUMENTS

| 1,263,961 | 4/1918 | Thomas | 339/186 R |
| 3,480,038 | 11/1969 | Simons | 119/14.41 X |
| 3,573,704 | 4/1971 | Tarver | 339/97 P |
| 3,629,804 | 12/1971 | Behymer | 339/98 R |
| 3,820,506 | 6/1974 | Conde | 119/14.01 |

Primary Examiner—Hugh R. Chamblee
Attorney, Agent, or Firm—Wegner, McCord, Wood & Dalton

[57] ABSTRACT

A stall cock and pulsator for a milker. The stall cock is mounted on the pulsation vacuum line and has an electrical terminal connected with a source of pulsation control signals. The pulsator has a vacuum inlet for connection with the vacuum outlet of the stall cock and an electrical terminal for connecting the pulsation signal from a stall cock terminal to the pulsator valve. The stall cock vacuum outlet and pulsator vacuum inlet are square in cross section and when mated align the pulsation signal terminals on the stall cock and pulsator for interconnection. The stall cock has a cable connector with conductors in the stall cock body that have ends projecting from the connector to pierce the insulating covering of the conductors of the pulsation signal cable. A clamp holds the cable in the cable connector. The ends of the conductors in the stall cock body are laterally spaced from the stall cock vacuum outlet and generally parallel with the pipeline. The cable connector and the cable are canted with respect to the pipeline so that each conductor in the body engages a different conductor of the cable.

2 Claims, 3 Drawing Figures

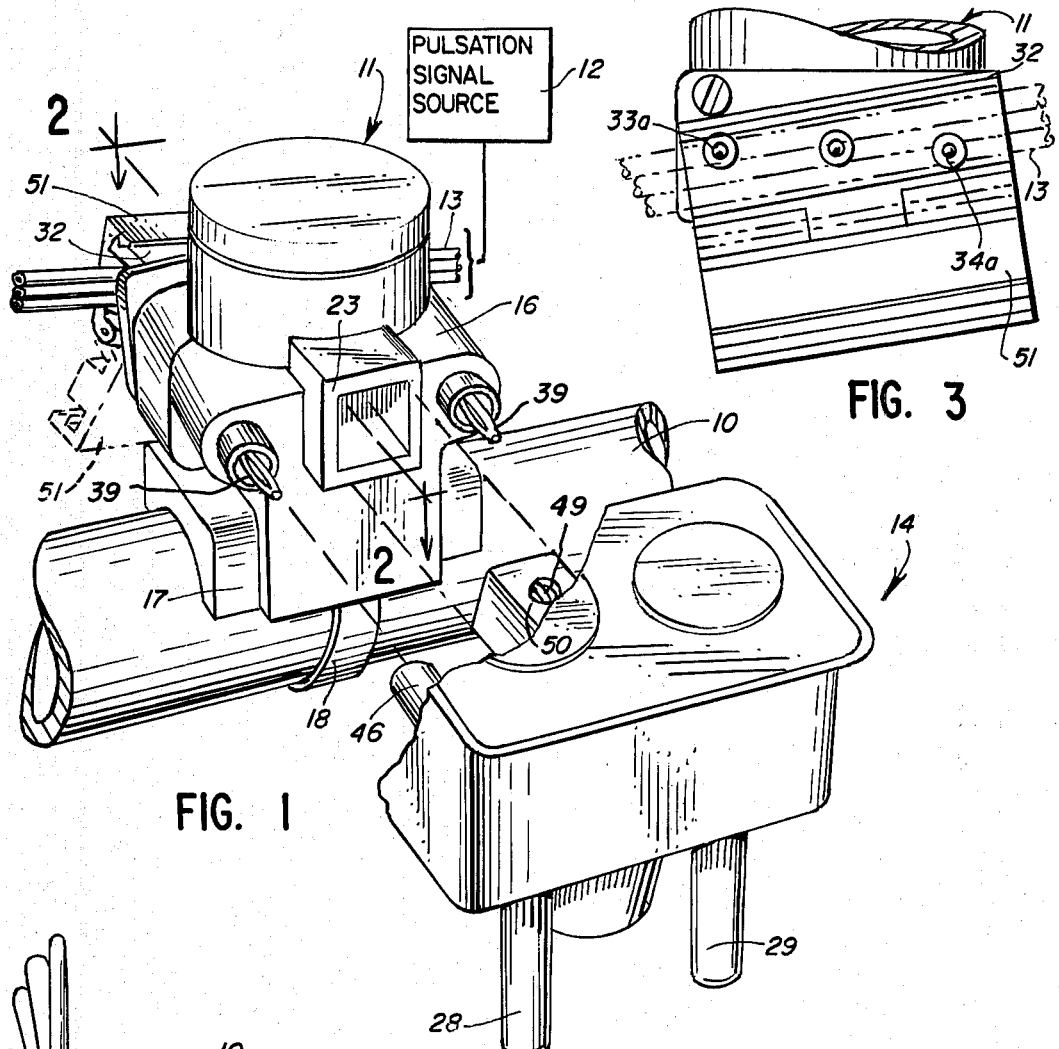
FIG. 1
FIG. 3
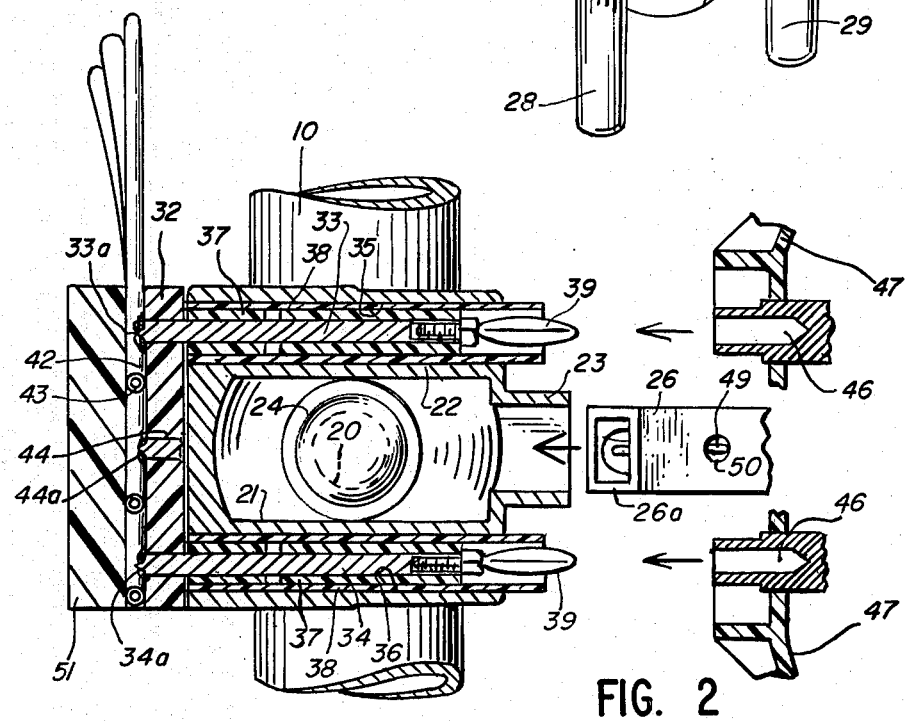
FIG. 2

STALL COCK AND PULSATOR FOR A MILKER

In a milking system such as that used in a stanchion barn, the milking apparatus is taken from cow to cow. A vacuum line extends through the barn and has stall corks to which the milking apparatus is connected. The dairyman carries the milker in one hand, the pulsator in the other and stands between two cows while reaching up to connect the pulsator with a stall cock. In a system using an electric pulsation control, a pulsator with a valve is connected with the stall cock and with the pulsation signal circuit. If the electrical terminals on the pulsator and stall cock are not properly aligned, the pulsation control circuit may not be completed and the terminals may be damaged.

It is a feature of the stall cock and the pulsator disclosed herein to provide mating surfaces on the stall cock and pulsator which when engaged align the electrical terminals for proper connection. More particularly, the vacuum outlet of the stall cock and the vacuum inlet of the pulsator have a square cross section and are telescoped when the pulsator is connected with the stall cock, aligning the electrical terminals for the pulsation control signal.

Another feature of the stall cock is an electrical cable connector for receiving a flat, multi conductor cable. The stall cock has electrical conductors in the stall cock body which extend into the cable connector and penetrate the insulating covering on the conductors of the cable. A clamp holds the cable in the connector.

Further features and advantages of the invention will readily be apparent from the following specification and from the drawings, in which:

FIG. 1 is an exploded perspective view of the stall cock and pulsator with a portion of the pulsator broken away;

FIG. 2 is a fragmentary transverse section through the stall cock taken along line 2—2 of FIG. 1, with the pulsator vacuum inlet and electrical terminals shown positioned for engagement with the stall cock; and FIG. 3 is a fragmentary rear elevation of the stall cock showing the cable connector with the cable clamp open and the multi conductor cable in broken lines.

Vacuum pipeline 10, FIG. 1, extends through the milking area and is typically located above the heads of the stalls of a stanchion barn. A stall cock as illustrated at 11 is provided for each pair of stalls. A pulsation signal source 12 is connected through a multi conductor flat cable 13 with the stall cocks. A pulsator 14 is connected with each milker unit as will be described below, and is moved from cow to cow and connected with the appropriate stall cock. Where bucket milkers are used, only a vacuum line extends through the milking area, providing both continuous vacuum in the bucket and alternating vacuum and air in the teat cup shells. In a pipeline milking system an evacuated milk pipeline (not shown) runs through the milking area generally parallel with vacuum line 10 and has the milker outlet connected thereto, the milk being drawn from the milker through the pipeline to a storage tank.

Pulsator 14 may provide for simultaneous milking of all four quarters or alternate milking of the front and rear quarters. The stall cock and pulsator illustrated in the drawings are for alternate milking.

Stall cock 11 has a molded plastic outer body 16 with a saddle portion 17 held to vacuum pipeline 10 by a strap 18. A hole 20 in the pipeline communicates through cavity 21 in steel inner body 22 with vacuum outlet 23. A ball stopper 24 is seated over the vacuum opening to seal the pipe when the pulsator is not connected to the stall cock.

Pulsator 14 has a vacuum inlet nipple 26 which is inserted into stall cock outlet 23 and displaces ball 24 to connect the vacuum to the pulsator. The pulsator has a pair of electrically operated valves (not shown) which are actuated by pulsation control signals to direct alternate air and vacuum to pulsator outlet nipples 28, 29. Hoses (not shown) connect pulsator outlet nipples 28, 29 with an air divider on the milker.

A channel-shaped plastic block 32 is mounted on the face of stall cock body 16 opposite vacuum outlet 23 and receives the multi conductor cable 13. Rod-like conductors 33, 34 extend through bores 35, 36 in the stall cock body and into the cable connector 32. Each of the conductive rods is surrounded by plastic sheaths 37, 38 and at its end adjacent vacuum outlet 23 has a resilient male connector 39, partially surrounded by protective sleeve 38. The end of each conductive rod 33, 34 extending from cable connector block 32 has a sharp point 33a, 34a which penetrates the insulating covering 42 on the associated conductor of cable 13 for engagement with the conductor 43 to transmit pulsation control signals through the stall cock body 16. A third rod-like conductor 44 with point 44a connects the steel inner body 22 of the stall cock with a third of the three conductors of cable 13 providing a common ground return for the pulsation control signals.

The three conductive rods 33, 34 and 44 define a plane generally parallel with vacuum pipeline 10 and are laterally spaced apart. Cable connector 32 and cable 13 are canted with respect to the pipeline 10 so that the laterally spaced conductive rods 33, 34 and 44 engage different ones of the three conductors of the flat cable 13. A clamp 51 (shown open in broken lines in FIG. 1) is hinged to cable connector 32 and, after the cable is inserted in the channel, is swung upwardly and latched forcing the sharpened ends of the conductors through the insulating coating on the cable conductors. The pulsation signal cable may readily be installed, it merely being necessary to string it through the milking area, align it in the channel of the cable connector for each stall cock and close the clamp.

Pulsator 14 has electrical terminals 46 each surrounded by a protective insulating sleeve 47, one on either side of vacuum inlet nipple 26. Connections from terminals 46 to the pulsator valves are not shown.

The stall cock vacuum outlet 23 and the pulsator vacuum inlet nipple 26 each have a mating square cross sectional configuration so that with the pulsator inlet nipple 26 inserted into stall cock outlet 23 the pulsator electrical terminals 46 are aligned with stall cock electrical terminals 39 and they may be engaged easily, reliably and without damage. The pulsator inlet nipple 26 extends beyond the electrical terminals 46 so that it is received in the stall cock outlet 23, aligning the parts, before the terminals engage. The protective sleeves 47 for pulsator terminals 46 are received inside the insulating sleeves 38.

Pulsator vacuum inlet 26 has its end face 26a formed at an angle to facilitate its insertion into the open end of stall cock vacuum outlet 23. The pulsator vacuum inlet 26 is a conductor and with the inner body 22 of the stall cock provides a ground return for the pulsation signal circuits for each of the pulsator valves. A spring 49 extends outwardly through a hole 50 in the pulsator inlet nipple to engage the inner surface of stall cock outlet 23 assuring a reliable electrical connection.

I claim:

1. In a milker having a pulsation vacuum line, a source of electrical pulsation control signals and a stall cock with a body mounted on said vacuum line for connection of a milker pulsator, the improvement comprising:
    a multi conductor flat cable connected with said control signal source, each conductor of the cable having an insulating covering thereon;
    a cable connector on said stall cock body to receive said cable;
    electrical conductors for the pulsation control signal carried by the stall cock body with ends projecting from the cable connector to pierce the insulating covering of the cable conductors, said conductor ends defining a line generally parallel with the vacuum line on which the stall cock is mounted; and
    a clamp for holding the cable in said cable connector said cable connector and cable being canted with respect to said line of conductor ends for engagement of each electrical conductor in said body with a different conductor of the cable.

2. The stall cock of claim 1 for an alternate pulsation milker with a three conductor cable and three conductors in the body of the stall cock.

* * * * *